Aug. 24, 1943.   R. T. HALSTEAD   2,327,706
METHOD OF CURVING MATERIAL
Filed May 9, 1941
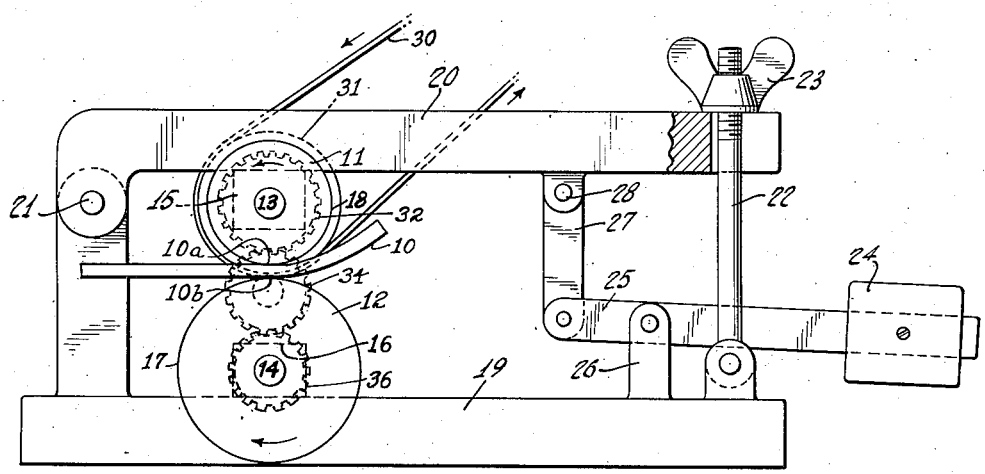
INVENTOR
RALPH T. HALSTEAD.
BY Virgil C. Kline
ATTORNEY Patented Aug. 24, 1943

2,327,706

UNITED STATES PATENT OFFICE 2,327,706

METHOD OF CURVING MATERIAL

Ralph T. Halstead, Somerville, N. J., assignor to Johns-Manville Corporation, New York, N. Y., a corporation of New York Application May 9, 1941, Serial No. 392,747

4 Claims. (Cl. 18—56)

This invention relates to curved sheet materials and to a method utilized in manufacturing the same. It relates especially to curved sheet materials such as friction materials which are suitable for use as brake blocks and brake linings as well as miscellaneous friction elements for different mechanisms and sheet materials where a definite curvature is required in the final product. In one of its more specific applications, the invention relates to an improved method of treating molded type friction material in which the necessary curvature is placed in the sheeted product prior to the final heat and compressing treatment as contrasted to the intermittent processes heretofore known.

In the previously known methods of manufacturing curved molded type friction materials, dry mixtures of the ingredients are thoroughly blended and placed in suitable molds having the desired curvature and then subjected to heat and compression. If a flat fibro-cementitious friction material, as described in the co-pending application of Bruce, Halstead and Douglas, Serial No. 369,058 now Patent No. 2,309,571, is desired to be placed in molds in order to apply heat and pressure, it is necessary to apply a preliminary curvature to the sheeted product before such heat treatment and compression operation. Thus, one of the features of the invention described herein is directed to the method utilized in obtaining the desired curvature in the products described in the copending application.

The method described and claimed herein may also be utilized in imparting a curvature to semi-cured and cured sheeted and woven friction material linings. Heretofore, in applying a curvature to these materials, concavity was imparted to the material as the curvature was applied. In order to use the thus formed curved friction material, the material must necessarily be ground to remove the concavity. If the concavity is not removed, the curved product does not make a satisfactory surface contact with the brake drum. The process, as described and claimed herein, will impart the proper curvature to molded and woven semi-cured or cured friction materials without imparting concavity to the material.

Curvatures may also be applied to large sheets of material, such as wall board, wherever permanent curvatures are desired in the finished product.

It is therefore an object of this invention to manufacture friction materials, especially brake blocks and brake linings, to impart a curvature to a flat, dry, compressed and unreacted thermo-setting material so that the material may be placed in curved molds for subsequent heat and compression treatments. If a direct bending moment were applied to the flat units in order to provide a curvature to fit the molds, the flat units would have a tendency to fracture. The curvature which is attained in the friction unit as a result of the application of the process hereinafter more fully described is permanent, and such a curving action will not be accompanied with fractures. It is also an object of this invention to apply a curvature to a flat and substantially unreacted thermo-setting unit so that the resulting curved unit will still have substantially the same strength and rigidity as before the curving operation.

It is a further object of this invention to impart a curvature to flat, dry, compressed and unreacted thermo-setting units without imparting minute surface fractures to the unit. The material, although slightly elastic, has substantially no plastic flow characteristic at normal temperature, and may ordinarily be classified as brittle. Thus, if a bending moment were applied to such flat materials without utilization of the process hereinafter described, the resulting products would have very poor strength and rigidity.

An additional object of this invention is to impart permanent curvatures to molded and woven, cured or semi-cured, friction materials without obtaining concavity in the product. The formation of concavities in friction materials, as the friction material is bent to conform with the curvatures of the brake drums, has always been objectionable. In order to use these materials with satisfaction, it has been the practice to remove the concavity by a grinding operation.

A further object is to apply permanent curvatures to any sheet materials wherever curvatures are desired in the final product.

Additional objects and advantages of the present invention will be apparent to those skilled in the art when applying and practicing the invention disclosed and described below.

Broadly stated, the invention comprises passing flat, substantially dry and compressed sheets or units between pressure applying means in which the pressure applying means rotate in opposite directions but move in the same direction at the points where contact is made with the units. The pressure applying means also move at different peripheral speeds and in view thereof the upper and lower surfaces of the unit, which are contacted by the pressure applying means, are subjected to different surface movements. As a result of the application of different surface movements to the unit, the unit will tend to curve toward the pressure applying means having the lower peripheral speed. In view of the uniform application of pressure and as a result of the contact between the pressure applying means, rotating at different speeds, and the upper and lower surfaces or faces of the flat units, curving will result and substantially no fractures of the curved unit will be obtained.

A more detailed description of the apparatus and process will be given in conjunction with the consideration of the accompanying drawing. In the description of the drawing, the process is described as being applied to friction materials but this description shall not be construed as a limitation since the process may be applied to curving other sheet materials with equal effectiveness.

The drawing illustrates a side view of the preferred apparatus used in applying curvatures to friction materials. Rolls 11 and 12 are mounted on shafts 13 and 14 which rotate in bearings 15 and 16. The surfaces of the rolls 11 and 12 are designated by the numerals 18 and 17. Bearing 16 is mounted upon any conventional base 19 and bearing 15 is mounted upon the arm 20. The base 19 and arm 20 are pivotally or swingably connected by means of the connecting and supporting pin 21.

The distance between rolls 11 and 12 may be varied by means of the pivotally mounted arm 22 and through the medium of the movable stop 23.

Rolls 11 and 12 are held in a separated or spaced condition through the medium of a system of linkages mounted on a support 26 which is mounted on base 19. Support 26 functions in the nature of a fulcrum and supports lever 25 upon which is mounted weight 24. The lever 25 is connected to arm 20 through the medium of a connecting link 27 and which is pivotally fastened to arm 20 by means of pin 28.

Weight 24, functioning through the medium of lever 25 and connecting link 27, creates a resultant force on arm 20 which tends to push and hold rolls 11 and 12 in a spaced relation. The distance between rolls 11 and 12 may be varied by moving the stop nut 23 on arm 22. It will be evident that if the materials passed between the rolls are all substantially the same thickness, the pressure applied thereto may be increased or decreasd by merely varying the distance between the rolls. If the distance between the rolls is decreased the pressure applied to the materials passing between the rolls will be increased and similarly, if the distance between the rolls is increased, the pressure applied to the materials will be decreased.

Rolls 11 and 12 rotate at different speeds and preferably have different coefficients of surface friction. The surface 17 of the roll 12 may be knurled which will tend to impart a higher coefficient of friction to the surface of the roll, as compared to the illustrated smooth surface 18 on roll 11. It is to be understood, however, that other mediums of increasing or decreasing the coefficient of friction on either roll may be utilized and come within the spirit and scope of the present invention. Such other mediums of accomplishing the increase or decrease of the coefficient of friction may be through the use of different surface compositions on the two rolls or by applying resinous, carbonaceous or similar materials to the surface of the rolls to obtain the desired effects.

In order to impart a curvature to any materials passed between the rolls, it is essential that the two rolls rotate at substantially different speeds. When the two rolls, rotating at different speeds, contact under pressure a sheet material passing therebetween, different rates of surface movements will be obtained in the sheet material at the point of contact and curving of the sheet will follow as a result of the different surface movements. The amount of curvature obtained on units passing between the rolls will be dependent upon the pressure applied and upon the difference in the peripheral speeds of the pressure applying rolls. The materials passed between the rolls will curl or curve away from the roll having the greater peripheral speed and will move toward the surface of the roll having the lower peripheral speed. The curvature of the unit may be varied to any degree merely by varying the compression applied to the surface. It is preferable that the roll rotating at the lower speed have a smaller diameter than the other roll inasmuch as the treated material will curve toward the surface of the lower speed roll, thus the maximum curvature obtained in the unit is governed by the diameter of the slower-moving roll.

The amount of pressure applied to the material passing between the rolls is approximately 1000 pounds per lineal inch of sheet width along the line of contact on molded and compressed but uncured friction materials such as described in the copending application referred to above. The pressure is, however, increased on semi-cured and cured molded and woven friction materials. In these cases the pressure is increased to approximately 6000 to 8000 pounds per lineal inch along the line of contact. Higher pressures may be used depending primarily on the density of the sheet material being treated. It is thus understood that these pressures may be varied depending on the amount of curvature desired and also on the density and thickness of the material being treated.

The present invention may be illustrated through the medium of the following example: Flat sheets of substantially dry and compressed friction compositions 10 were fed or drawn between the compression rolls 11 and 12 as illustrated in the drawing. Roll 11 having a diameter of about 7 inches, was rotated (as by belt and pulley drive 30 and 31 for shaft 13) at a speed of about 40 revolutions per minute, and roll 12, having a diameter of about 12 inches, was rotated (as by gear drive 32, 34, and 36 for shaft 14) at a speed of about 60 revolutions per minute. At the line contact between the sheet 10 and the rolls 11 and 12, the upper surface of the sheet at point 10a, had a slower forward movement as compared to the forward movement of the lower surface of the sheet at point 10b. A slight stretching or extending action will thus occur in the lower portion of the sheet but due to the simultaneous application of pressure, the density of the product will not vary substantially throughout the thickness of the product. Inasmuch as a slight stretching action occurs in the lower portion at the line contact point, the sheet tends to move or curve upwardly toward the roll having the lower peripheral speed. Very good results have been obtained by using a slightly knurled surface on the roll having the greater number of revolutions per minute.

In applying a pressure of approximately 12,000 lbs. to a sheet 1/16 inch thick and 4 inches wide, the resulting diameter of curvature was about 17 inches. In the case of the application of about 16,000 lbs. pressure to a sheet having the same dimension, the resulting diameter of curvature was about 12 inches. It will thus be evident from the example given that as the pressure is varied the resulting curvature will be changed.

After the proper curvature has been applied to unreacted thermo-setting sheets, the curved product may be placed in steam-heated molds and subjected to pressure and heat treatment to react the conventional thermo-setting resinous components ordinarily found in molded friction material compositions.

The curved products obtained as a result of the above described process will have substantially no surface cracks and substantially no fractures which would tend to reduce the strength of the final product. It will be obvious as a result of the above description, that the degree of curvature may be varied at will within relatively large limits depending entirely upon the amount of curvature desired in the final product.

The method may be modified without departing from the spirit of the present invention and it is to be understood that the details of the description set forth are only for purposes of illustration and that the invention is to be limited only by the scope of the appended claims.

I claim:

1. The method of forming a curvature in a flat, fibrous sheet which consists in advancing the sheet through the bite between and contacting two oppositely curved pressure-applying surfaces while applying pressure thereto, and positively moving said surfaces in the same direction and in the direction of sheet advance at the line of contact and at substantially and distinctly different speeds, whereby the sheet is curved toward the surface having the lower speed of movement.

2. The method of developing a uniform curvature in a flat, fibrous sheet which consists in advancing the sheet through the bite between opposed, spaced pressure rolls while applying pressure through the rolls to the sheet, and simultaneously rotating the roll surfaces in the direction of sheet advance at the line of contact with the sheet and at peripheral speeds which differ by approximately 2½ to 1, thereby curving the sheet in the direction of the surface having the lower speed of movement.

3. The method of developing a uniform curvature in a flat, fibrous sheet which consists in advancing the sheet through the bite between opposed, spaced pressure rolls while applying pressure through the rolls to the sheet in amounts ranging between 1,000 and 8,000 lbs. per linear inch of sheet width, and simultaneously rotating the roll surfaces in the direction of sheet advance at the line of contact therewith and at substantially different peripheral speeds.

4. The method of developing a uniform curvature in a flat, thermo-setting fibro-cementitious sheet which consists in advancing the sheet in uncured brittle state through the bite between spaced, smooth-surfaced pressure rolls, simultaneously applying thereto a pressure of approximately 1,000 lbs. per linear inch of sheet width along the line of contact, simultaneously rotating the roll surfaces at substantially different peripheral speeds in the direction of movement of the sheet at the line of contact whereby one face of the sheet is uniformly stretched relatively to the other, thereby curving the sheet in the direction of the face having the lower rate of advance, and finally curing the curved sheet by application of heat and pressure.

RALPH T. HALSTEAD.